US012129865B2

(12) United States Patent
Eisenbarth et al.

(10) Patent No.: US 12,129,865 B2
(45) Date of Patent: Oct. 29, 2024

(54) COMPRESSOR WHEEL

(71) Applicant: BorgWarner Inc., Auburn Hills, MI (US)

(72) Inventors: Markus Eisenbarth, Mainz-Kastel (DE); Martin Schön, Fürfeld (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/900,185

(22) Filed: Aug. 31, 2022

(65) Prior Publication Data

US 2023/0193922 A1 Jun. 22, 2023

(30) Foreign Application Priority Data

Dec. 18, 2021 (DE) ........................ 102021133772.0

(51) Int. Cl.
*F04D 29/28* (2006.01)
*F04D 17/10* (2006.01)
*F04D 29/30* (2006.01)

(52) U.S. Cl.
CPC ........... *F04D 29/284* (2013.01); *F04D 17/10* (2013.01); *F04D 29/30* (2013.01); *F05D 2220/40* (2013.01); *F05D 2240/20* (2013.01)

(58) Field of Classification Search
CPC ............................... F04D 29/284; F04D 29/30
See application file for complete search history.

(56) References Cited

U.S. PATENT DOCUMENTS 4,596,501 A 6/1986 Wu
5,215,439 A * 6/1993 Jansen .................. F04D 29/284 416/235
7,465,155 B2 12/2008 Nguyen
8,721,287 B2 * 5/2014 Billotey ................ F04D 29/284 415/206

(Continued)

FOREIGN PATENT DOCUMENTS

DE 102011079254 A1 10/2012
DE 102012106810 A1 1/2014

OTHER PUBLICATIONS

Machine-assisted English language abstract and machine-assisted English language translation for DE 10 2011 079 254 A1 extracted from espacenet.com database on Aug. 31, 2022, 12 pages.

(Continued)

*Primary Examiner* — Justin D Seabe
(74) *Attorney, Agent, or Firm* — Howard & Howard Attorneys PLLC

(57) ABSTRACT

A compressor wheel for a compressor of a turbocharger has a hub (16) and a multiplicity of blades (12) on the hub (16). In intermediate spaces of the multiplicity of blades (12), a channel is in each case formed between a suction side (24) and a pressure side (26). The channel guides fluid that flows in axially in relation to a rotation axis (22) radially or radially-axially outward. The hub (16) in relation to the rotation axis (22) in at least one channel is contoured with a rotationally symmetrical portion (18') and a non-rotationally symmetrical portion (18). The non-rotationally symmetrical portion (18) is formed by radii that are variable in the flow direction, and a transition region (28) between the hub (16) and the blade (12) adjoins the non-rotationally symmetrical portion (18).

8 Claims, 5 Drawing Sheets

(56) References Cited

U.S. PATENT DOCUMENTS

| | | | | |
|---|---|---|---|---|
| 9,951,787 | B2 | 4/2018 | De Santis et al. | |
| 9,988,907 | B2 * | 6/2018 | Xu | F01D 5/141 |
| 10,689,982 | B2 * | 6/2020 | Soeguet | F01D 5/04 |
| 10,830,070 | B2 * | 11/2020 | Bennington | F01D 5/143 |
| 11,473,429 | B2 * | 10/2022 | Akimoto | F01D 5/141 |
| 2007/0134086 | A1 * | 6/2007 | Higashimori | F04D 29/681<br>415/208.3 |
| 2013/0164137 | A1 * | 6/2013 | Barnes | F01D 5/145<br>416/204 A |
| 2015/0125302 | A1 | 5/2015 | Roberto et al. | |
| 2016/0245297 | A1 * | 8/2016 | Husted | F04D 29/668 |
| 2018/0313366 | A1 | 11/2018 | Lehmayr et al. | |
| 2020/0217204 | A1 * | 7/2020 | Schiebel | F01D 5/048 |

OTHER PUBLICATIONS

English language abstract for DE 10 2012 106 810 A1 extracted from espacenet.com database on Aug. 31, 2022, 2 pages.

* cited by examiner

COMPRESSOR WHEEL

CROSS-REFERENCE TO RELATED APPLICATIONS

This application claims priority pursuant to 35 U.S.C. 119(a) to German Patent Application No. 102021133772.0 filed Dec. 18, 2021, which application is incorporated herein by reference in its entirety.

BACKGROUND

The invention relates to a compressor wheel, in particular for a compressor of an exhaust turbocharger.

Charging devices in the form of exhaust turbochargers in which a turbine wheel drives a compressor wheel of a compressor are known from the general prior art. The turbine wheel and the compressor wheel are disposed on a common rotor which is rotatably guided in a bearing housing. The turbine wheel is driven by a flow of exhaust gas. The compressor is disposed in the induction duct of an internal combustion engine.

Compressor wheels nowadays are usually produced by milling. Known milled compressor wheels have an axially symmetrical hub. Variable radiusing, which can improve the durability or service life of a compressor wheel, is used in the transition between the hub and the blades here. However, variable radiusing is very complex in terms of manufacturing technology, because the production thereof is very time consuming, which manifests itself in additional milling paths. Radiused features of this type in the transition to the blades are often also referred to as a blade connection radius.

A rotor for a fluid power machine in the form of an exhaust turbocharger having a hub and a multiplicity of rotor blades about which a medium flowing through the exhaust turbocharger can flow is known from DE 10 2012 106 810 A1, wherein a blade channel is in each case configured between two rotor blades positioned next to one another, the blade channel having a blade channel length which extends in the axial direction of the rotor, wherein each rotor blade is connected to the hub by way of a first transition region, having at least one curvature, and a second transition region, having at least one second curvature, wherein a blade channel base of the blade channel between the first transition region and the second transition region at least in regions is configured so as to be variable, and wherein the blade channel base is at least partially designed so as to be adaptable to a face configured so as to be largely flat, wherein the face is configured so as to be inclined in relation to a tangential face of the hub, and conjointly with the tangential face of the hub encloses an angle, wherein a section line between the face and the tangential face of the hub determines an overall length of the face that extends in the circumferential direction of the hub.

Known from DE 10 2011 079 254 A1 is a compressor wheel for an exhaust turbocharger, which has a hub having centrically disposed therein a hub bore, a wing which in the radial direction adjoins the hub toward the outside and configures a wheel back, and has compressor blades disposed on the wing and the hub. In the region of the hub and/or in the region of the wheel back and/or in the transition regions of the compressor blades to the hub and the wing, internal stress is incorporated in the material of the compressor wheel.

SUMMARY

Proceeding from this prior art, the inventors have set the object of achieving a compressor wheel, in particular for a compressor of an exhaust turbocharger, which is able to be produced in a shorter machining time in a milling process.

This object is achieved by the features of independent patent claim 1. Further advantageous design embodiments of the invention are in each case the subject matter of the dependent claims. These design embodiments can be combined with one another in any technologically meaningful manner. The description, in particular in conjunction with the figures, characterizes and specifies the invention further.

Set forth according to the invention is a compressor wheel, in particular for a compressor of a turbocharger, which has a hub and a multiplicity of blades on the hub, wherein in intermediate spaces of the multiplicity of blades a channel is in each case formed between a suction side and a pressure side, the channel guiding fluid that flows in axially in relation to a rotation axis radially or radially-axially outward, wherein the hub in relation to the rotation axis is contoured with a rotationally symmetrical portion and a non-rotationally symmetrical portion, wherein the non-rotationally symmetrical portion is formed by a radius that is variable in the flow direction, and a transition region between the hub and each of the blades adjoins the non-rotationally symmetrical portion by way of a constant-radius connection.

Accordingly, in comparison to conventional blade connections having a variable radius in the case of a rotationally symmetrical hub, a non-rotationally symmetrical hub in which the blade connection is embodied with a constant radius is henceforth used. Instead of using variable radiusing, a contoured hub having two regions is now used. Besides the portion that is rotationally symmetrical to the rotation axis, the non-rotationally symmetrical portion is used as a tangential transition to the now constant radiusing of the blade of the compressor wheel. Both portions of the hub of the compressor wheel according to the invention can be produced in approximately the same time as hubs that are already known. However, the production time in the machining by milling is significantly reduced because variable radiusing no longer has to be performed.

According to one embodiment of the invention, the transition region is embodied as a constant-radius connection or as variable radiusing. The transition region here can be embodied as a constant-radius connection, the radius of the latter corresponding to that of a ball cutter.

For the non-axially symmetrical portion of the hub, a two-dimensional set of parameters can be specified for each point of the transition between the hub and the blade along the blade connection. When manufacturing the compressor wheel by means of a milling cutter, the transition region can be formed by the spherical tip of the milling cutter, this enabling in a simple manner a connection with a constant radius.

According to a further embodiment of the invention, the non-rotationally symmetrical portion of the hub has a region of modified thickness.

The region of greater thickness is formed by the non-rotationally symmetrical portion of the hub.

According to one further embodiment of the invention, the region of modified thickness is embodied in that a surface of the hub is raised or lowered in comparison to a rotationally symmetrical hub.

According to one further embodiment of the invention, the region of modified thickness is embodied such that internal stress in the compressor wheel is reduced.

The hub shape here can reduce potential internal stress, as a result of which the service life of the compressor wheel is increased.

According to one further embodiment of the invention, the rotationally symmetrical portion and the non-rotationally symmetrical portion of the hub are able to be produced in a milling process.

The non-axially symmetrical region is used as a tangential transition to the constant radiusing. The axially symmetrical region and the non-axially symmetrical region are machined in one step.

According to one further embodiment of the invention, the non-rotationally symmetrical portion of the hub begins at the external periphery of the hub and extends radially inward.

According to one further embodiment of the invention, the non-rotationally symmetrical portion of the hub partially spans the region between the blades.

According to one further embodiment of the invention, the non-rotationally symmetrical portion of the hub is configured on all channels of the compressor wheel.

Finally set forth is a charging device in a vehicle, wherein the charging device has a compressor having a compressor wheel as described above.

A charging device of this type can be provided as a VTG charger. However, a compressor wheel according to the invention can also be used in an electrically assisted turbocharger (also referred to as an E-Turbo) or an electrically driven compressor. Besides the use in a charging device, the compressor wheel according to the invention can also be used in an air supply to a fuel cell or else in a recuperation fan of a fuel cell.

BRIEF DESCRIPTION OF THE DRAWINGS

A number of exemplary embodiments will be discussed in more detail below on the basis of the drawing, in which.

DETAILED DESCRIPTION

In the figures, identical or functionally equivalent components are provided with the same reference signs.

Figure 1:
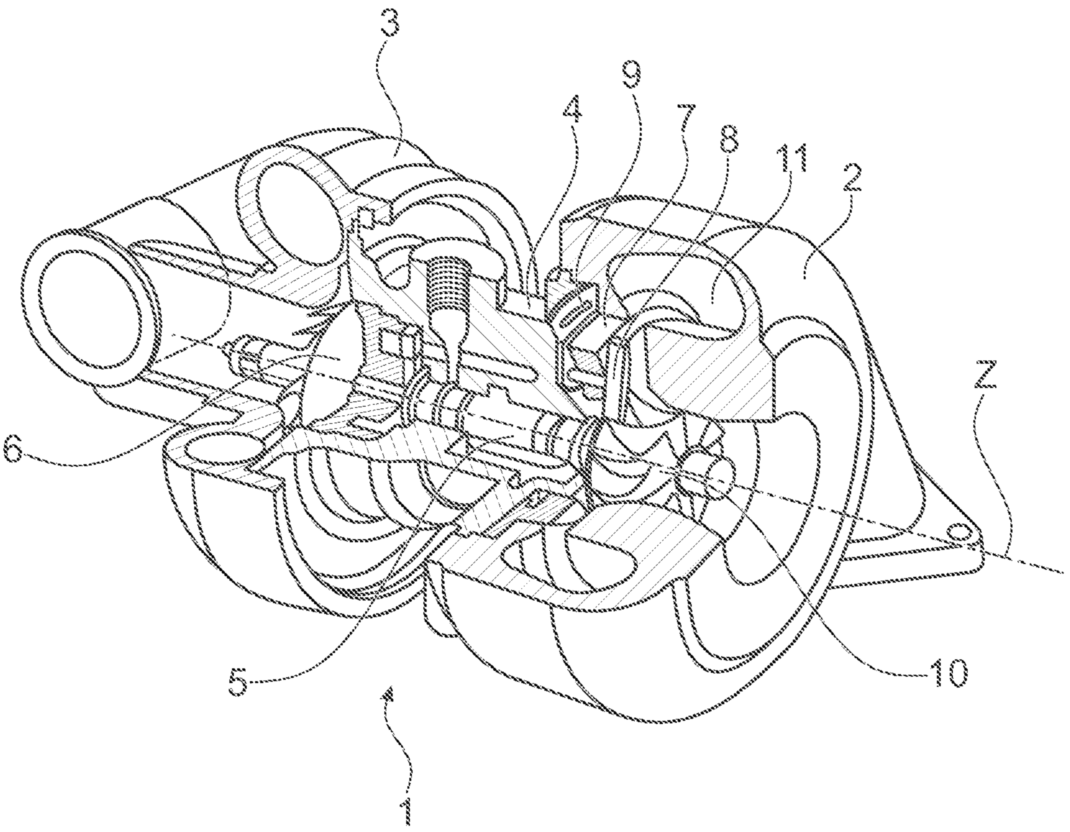
FIG. 1 shows a charging device for an internal combustion engine in a sectional illustration.

Firstly, a charging device 1 in which a design embodiment of a compressor wheel according to the invention can preferably be used will be schematically described hereunder by means of FIG. 1. FIG. 1 in a sectional view here shows the charging device 1 only in a highly schematic manner in order to be able to illustrate the position of the individual components. Charging devices 1 of this type are known per se from the prior art.

FIG. 1 shows a perspective, partially sectional view of a charging device 1 according to the invention. The charging device 1 has a turbine housing 2 and a compressor housing 3 connected to the turbine housing 2 via a bearing housing 4. The turbine housing 2, the compressor housing 3 and the bearing housing 4 are disposed along an axis Z. The turbine housing 2 is shown in a partially sectional view. The shaft 5 here connects a turbine wheel 10 to a compressor wheel 6. A variable turbine geometry, which has a plurality of adjustable blades 8 that are distributed across the circumference and have corresponding rotation axes, is disposed on the turbine side by means of a blade bearing ring 7. As a result, nozzle cross sections are formed which are larger or smaller depending on the position of the adjustable blades 8 and via which the exhaust gas of an engine supplied via a supply duct 11 and discharged via a central port impinges to a greater or lesser extent the turbine rotor 10 situated in the center on the axis Z, in order, via the turbine rotor 10, to drive the compressor wheel 6. To control the movement or the position of the adjustable blades 8, an activation installation or an actuator is provided, which may be designed for example as an electric actuator or as a pneumatic actuator. The activation installation can set in a slight rotating movement an adjustment ring 9 which lies behind the blade bearing ring 7.

It goes without saying that charging devices 1, as are schematically illustrated in FIG. 1 for the purpose of explanation, generally comprise even further components in order to be able to be used in an internal combustion engine. A charging device 1 of this type is also referred to as a VTG charger.

The design embodiment of the compressor wheel 6 according to the invention, which can be used in the charging device 1, will now be described below in more detail. However, a compressor wheel 6 according to the invention can also be used in an electrically assisted turbocharger (also referred to as an E-Turbo) or an electrically driven compressor. Besides the use in a charging device, the compressor wheel 6 according to the invention can also be used in an air supply to a fuel cell or else in a recuperation fan of a fuel cell.

Figure 2:
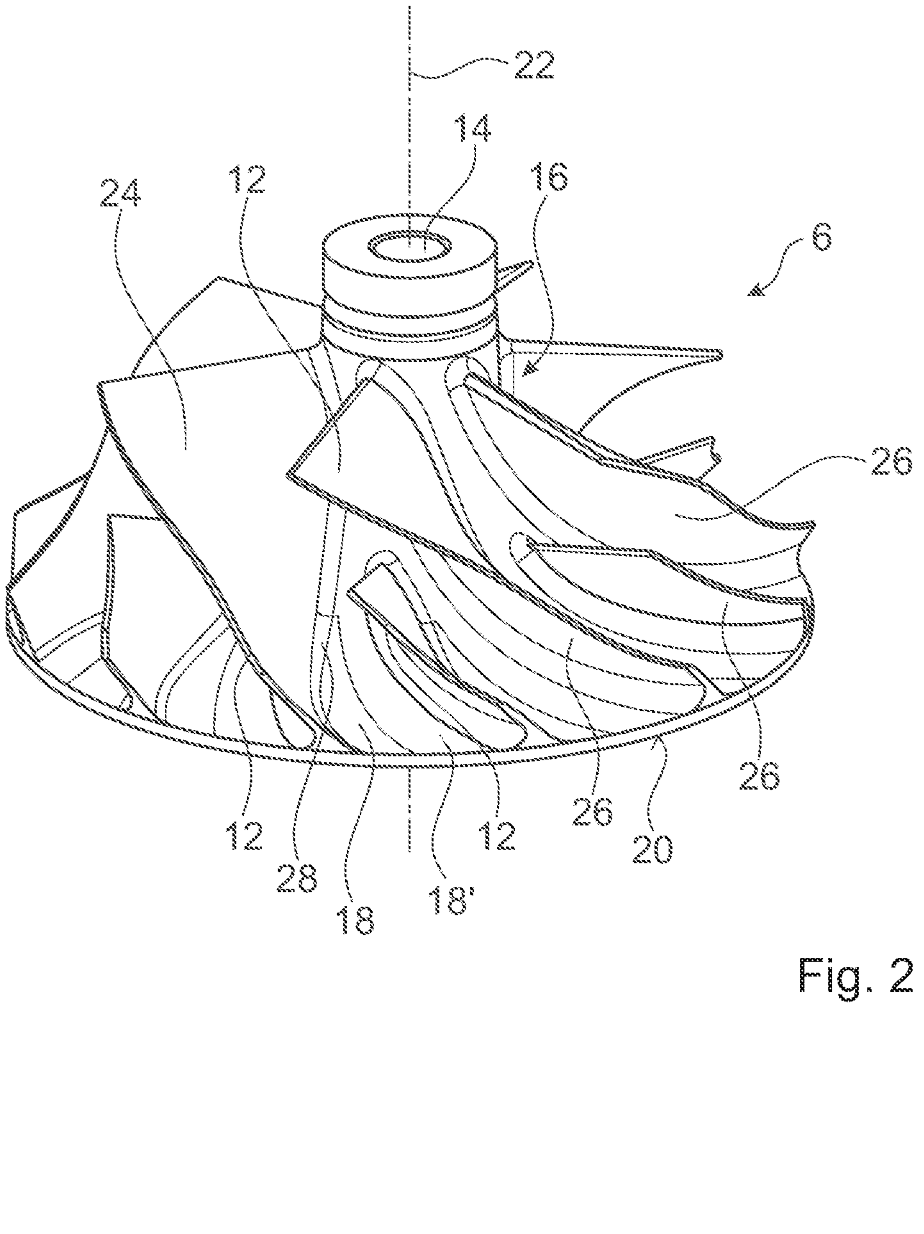
FIG. 2 shows an embodiment of a compressor wheel according to the invention in a perspective lateral view.

The compressor wheel 6 is illustrated in a perspective lateral view in FIG. 2. It can be seen that the compressor wheel 6 has rotor blades or blades 12 which are preferably equidistantly spaced apart and disposed on a hub 16 provided with a bore 14.

The hub 16 has a rotationally symmetrical portion and a non-rotationally symmetrical portion. The non-rotationally symmetrical portion in FIG. 2 is identified by means of the reference sign 18. This here is thus a region of a greater thickness such that the hub is thickened or raised in comparison to the planar rear side 20. The term rotationally symmetrical here refers to the rotation axis 22 which is established in the center of the bore 14 through the shaft. The rotationally symmetrical portion 18' and the non-rotationally symmetrical portion 18 of the hub 16 are conjointly formed in a milling process. The thickening about the non-rotationally symmetrical portion 18 in the compressor wheel 6 according to the invention is configured on the suction side of the blade 12.

The suction side here is understood to be the side of the blade 12 that is visible from the inflow direction of the compressor wheel 6. The opposite side in this instance is correspondingly the pressure side. The suction side is provided with the reference sign 24 in FIG. 2, while the pressure side is provided with the reference sign 26.

The transition between the blade 12 on the suction side 24 and the non-rotationally symmetrical portion 18 of the hub 16 in the case of the compressor wheel 6 according to FIG. 2 is embodied with a constant-radius connection 28. This also applies to the transition of the blade 12 on the pressure side 26. The transition between the blade 12 and the hub 16 is thus embodied by way of constant radiusing. The previously required variable radiusing on the blade is replaced by a non-rotationally symmetrical portion of the hub. However, it is also possible for variable radiusing to be provided here instead of the constant-radius connection.

Figure 3A:
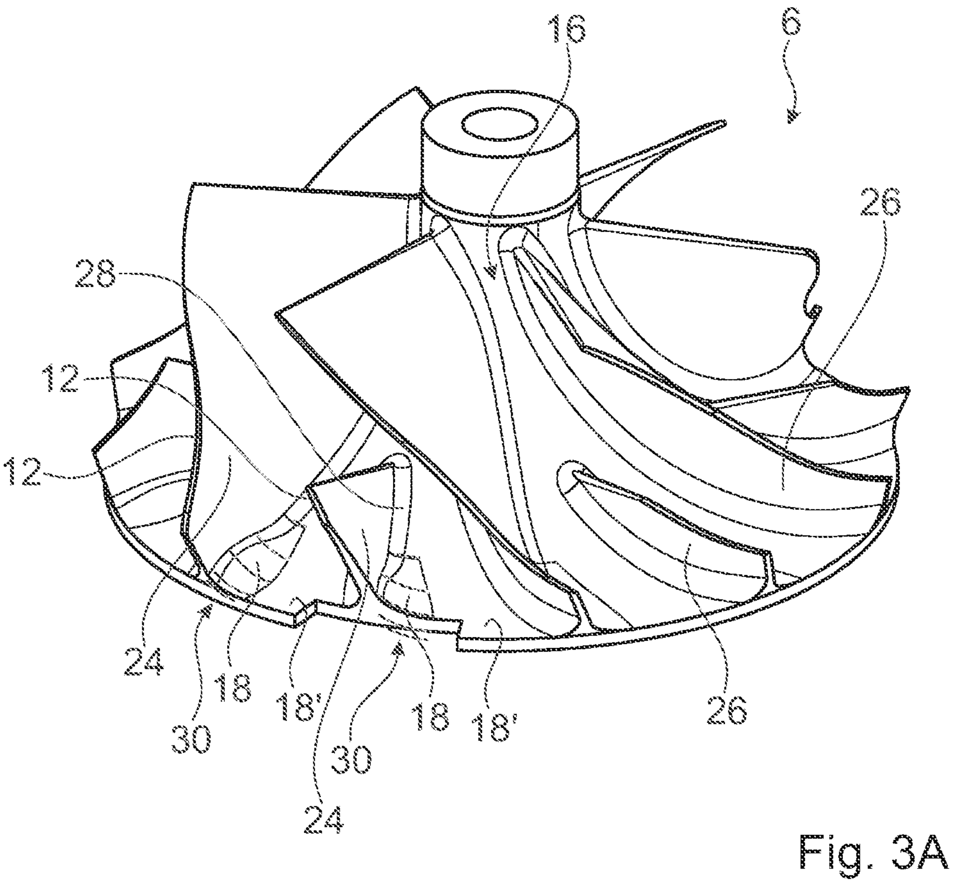
FIG. 3A shows a further compressor wheel according to the invention in a partially cut-away, perspective lateral view.
Figure 3B:
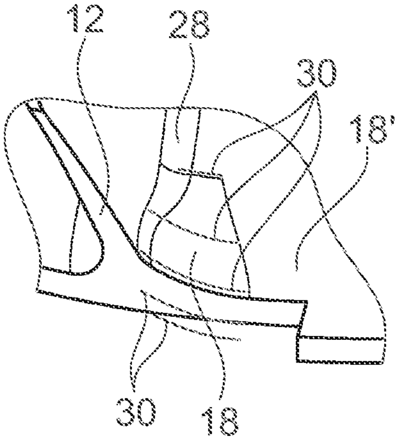
FIG. 3B shows a detail of the compressor wheel from FIG. 3A in a partially cut-away, perspective lateral view.
Figure 3C:
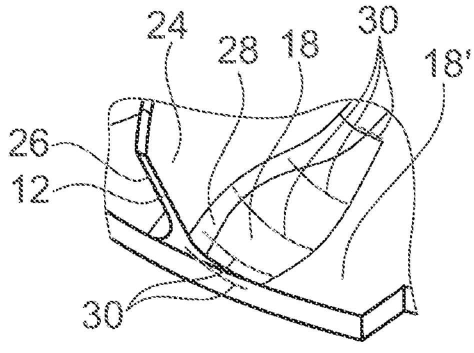
FIG. 3C shows a further detail of the compressor wheel from FIG. 3A in a partially cut-away, perspective lateral view.

This is shown once again in a different illustration in FIG. 3. A further embodiment of a compressor wheel 6 according to the invention is shown with reference to FIG. 3A, FIG. 3B and FIG. 3C. A partially cut-away, perspective lateral view of the compressor wheel 6 is illustrated in FIG. 3A. A detail in the region of the non-rotationally symmetrical portion 18 is illustrated once again in an enlarged manner in FIG. 3B. The detail from FIG. 3B is shown in a non-cut-away illustration in FIG. 3C. It can be seen from FIGS. 3A to 3C that the radius 30, or else the width, of the non-rotationally symmetrical portion 18 varies across the length of the hub 16.

Figure 4A:
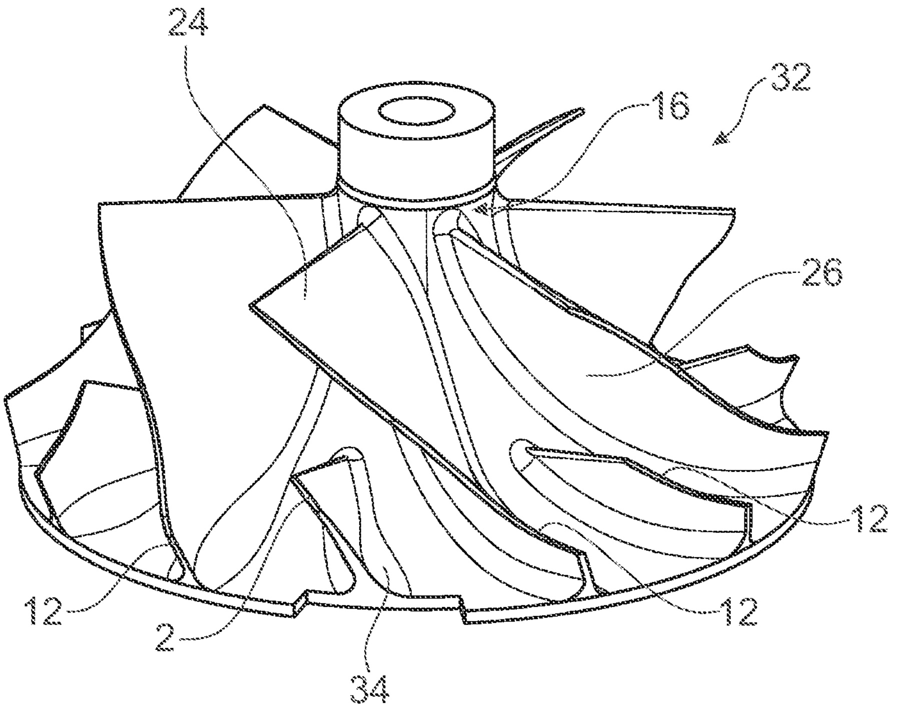
FIG. 4A in a comparative example shows a known compressor wheel in a perspective lateral view.
Figure 4B:
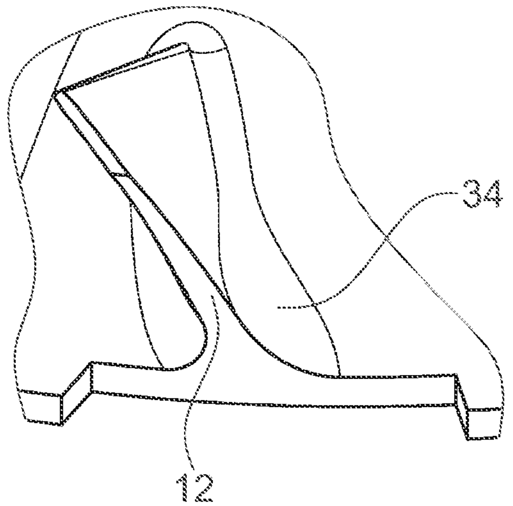
FIG. 4B shows a detail of the compressor wheel from FIG. 4A in a perspective lateral view.

In comparison thereto, a compressor wheel 32 of identical construction, with variable radiusing 34 is shown in a partially cut-away perspective lateral view in FIG. 4A and in a detail from the latter in FIG. 4B.

Figure 5A:
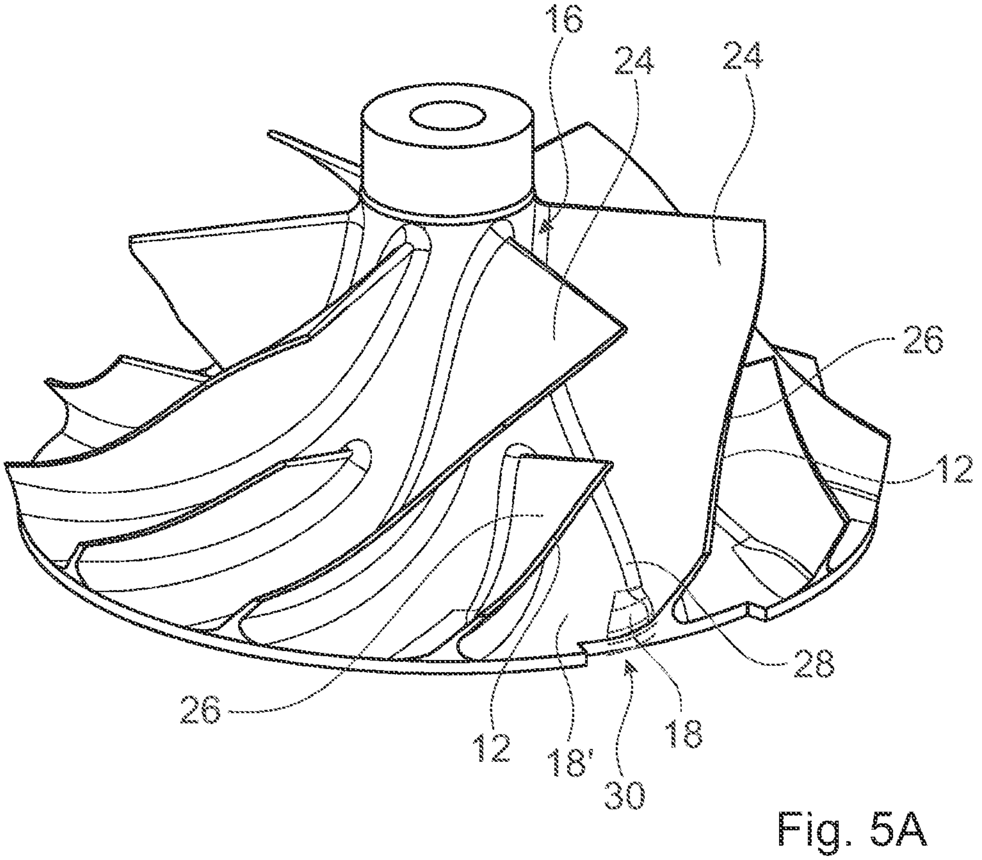
FIG. 5A shows a further compressor wheel according to the invention in a partially cut-away, perspective lateral view.
Figure 5B:
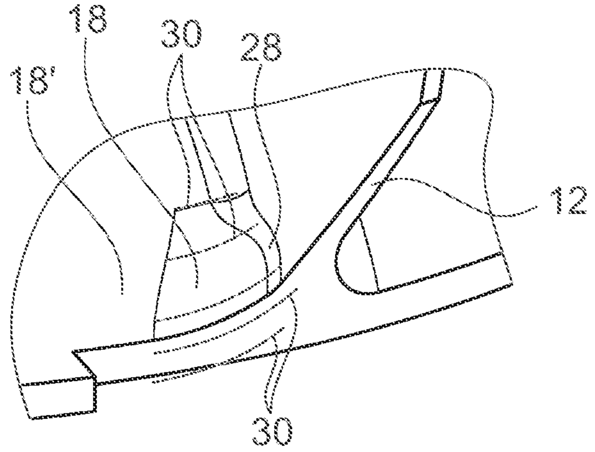
FIG. 5B shows a detail of the compressor wheel from FIG. 5A in a partially cut-away, perspective lateral view.

A yet again further embodiment of a compressor wheel 6 according to the invention is shown with reference to FIG. 5A and FIG. 5B. FIG. 5A here again corresponds to a partially cut-away, perspective lateral view, and FIG. 5B corresponds to a detail of the latter. In this example, the radii 30 along the hub 16 are configured with less dissimilarity than in comparison to the embodiment according to FIGS. 4A, 4B and 4C. By virtue of the compressor wheel 6 being produced by means of a milling process, the surface contours of the different compressor wheels 6 shown are moreover also superimposed by milling grooves which for the sake of simplicity have been omitted in the idealized illustrations of the embodiments discussed.

Rotationally symmetrical hubs which have been embodied with a variable connection to the blade have been used in compressor wheels known in the prior art to date. The variable connection can take place by way of a radius which is configured so as to be variable over the flow direction. According to the invention, the rotationally symmetrical portion 18' of the hub is followed by a non-rotationally symmetrical portion 18 that is formed by a radius 30 which is variable in the flow direction. The radiused connection 28, which is likewise formed by a radius that is constant over the flow direction, adjoins the non-rotationally symmetrical portion 18.

The features specified above and in the claims and shown in the figures can be advantageously implemented both individually and in various combinations. The invention is not restricted to the exemplary embodiments described, but may be modified in various ways within the scope of the abilities of a person skilled in the art.

LIST OF REFERENCE SIGNS

1 Charging device
2 Turbine housing
3 Compressor housing
4 Bearing housing
5 Shaft
6 Compressor wheel
7 Vane bearing ring
8 Adjustable blades
9 Adjusting ring
10 Turbine wheel
11 Supply duct
12 Vane
14 Bore
16 Hub
18 Non-rotationally symmetrical portion
18' Rotationally symmetrical portion
20 Rear side
22 Rotation axis
24 Suction side
26 Pressure side
28 Radiused connection
30 Radius
32 Compressor wheel
34 Radiusing

What is claims is:

1. A compressor wheel for a compressor of a turbocharger, the compressor wheel comprising a hub and a multiplicity of blades on the hub, wherein in intermediate spaces of the multiplicity of blades a channel is in each case formed between a suction side and a pressure side, the channel configured to guide fluid that flows in axially in relation to a rotation axis and further configured to guide fluid radially or radially-axially outward, wherein the hub in relation to the rotation axis in at least one channel is contoured with a rotationally symmetrical portion and a non-rotationally symmetrical portion, wherein the non-rotationally symmetrical portion has a region of modified thickness configured to be tangential to the rotationally symmetrical portion and is formed by radii that are variable in the flow direction, wherein the non-rotationally symmetrical portion of the hub begins at the external periphery of the hub and extends radially inward, and a transition region embodied as a radiused connection between the hub and the suction side of the blade adjoins the non-rotationally symmetrical portion.

2. The compressor wheel as claimed in claim 1, wherein the transition region is embodied as a constant-radius connection, and wherein the radius of the constant-radius connection corresponds to that of a ball cutter.

3. The compressor wheel as claimed in claim 1, wherein the rotationally symmetrical portion and the non-rotationally symmetrical portion of the hub are produced in a milling process.

4. The compressor wheel as claimed in claim 1, wherein the region of modified thickness is embodied in that a surface of the hub is raised or lowered in comparison to a rotationally symmetrical hub.

5. The compressor wheel as claimed in claim 1, wherein the region of modified thickness is embodied such that internal stress in the compressor wheel is reduced.

6. The compressor wheel as claimed in claim 1, wherein the non-rotationally symmetrical portion of the hub partially spans the region between the blades.

7. The compressor wheel as claimed in claim 1, wherein the non-rotationally symmetrical portion of the hub is configured on all channels of the compressor wheel.

8. A charging device in a vehicle, wherein the charging device has a compressor having a compressor wheel as claimed in claim 1.

* * * * *